United States Patent Office 3,294,566
Patented Dec. 27, 1966

3,294,566
SILOXANE WATER-REPELLENT COMPOSITION
Kenneth Graham Cooper, Glamorgan, Wales, assignor to Midland Silicones Limited, London, England
No Drawing. Filed Dec. 5, 1962, Ser. No. 242,350
Claims priority, application Great Britain, Dec. 12, 1961, 44,419/61
1 Claim. (Cl. 106—287)

This invention relates to novel organosilicon compositions and their application to porous and fibrous materials.

Organosilicon compounds, particularly the organopolysiloxanes containing methyl groups and hydrogen atoms bonded to the silicon, have long been known to be suitable for producing water repellency in porous and fibrous materials. Although such organopolysiloxanes have proved a commercial and technical success they have suffered from the disadvantage of possessing only fair to moderate resistance to washing and dry cleaning and other processes involving wet or dry abrasion. During some of these processes a considerable proportion of the siloxane may be removed or their water repellent characteristics may be masked under the action of soaps or solvents with consequent loss in the water repellency of the treated fabric.

One method of overcoming the above disadvantage consists in applying to the substrate in the presence of a cyanuric halide, such as cyanuric chloride, an organo silicon compound in which at least some of the organic substituents are those containing at least one reactive hydrogen atom. It is now proposed to further improve the washability of fibrous materials treated with siloxanes by carrying out the described treatment in the presence of a reaction product of an organic base and an acid.

The object of this invention is to introduce a novel composition suitable for treating fibrous materials to render them water repellent. A further object is a water repellent treatment for fibrous materials which treatment is not lost by washing or dry cleaning. Other objects and advantages of this invention are detailed in or will be apparaent from the disclosure.

The present invention provides a composition suitable for the treatment of porous and fibrous materials consisting essentially of (1) a mixture or a reaction product of (a) an organosilicon compound in which at least some of the organic substituents are those containing at least one reactive hydrogen atom and (b) a cyanuric halide or mono-substituted cyanuric halide, and (2) a salt formed by reaction of an organic base with an organic acid.

This invention further provides a process for the treatment of a porous and fibrous substrate consisting essentially of contacting said substrate with a mixture of (1) a mixture or a reaction product of (a) an organosilicon compound in which at least some of the organic substituents are those containing at least one reactive hydrogen atom and (b) a cyanuric halide or mono-substituted cyanuric halide, and (2) a salt formed by the reaction of an organic base with an organic acid, thereafter heating the treated porous and fibrous substrate to a temperature below its decomposition temperature but sufficiently high to ensure at least partial decomposition of the salt (2) and promote bonding of the organosilicon polymer to the substrate through the cyanuric linkage. The said compositions can be applied to the porous and fibrous material in a volatile organic solvent.

The organosilicon compounds which are operative in the present invention can be monomeric or polymeric, for example, they can be organo substituted silanes or polysiloxanes. However, in order to achieve the object of the present invention it is necessary that at least some of the organic substituents present in the organosilicon compound are those having a functional group which contains a reactive hydrogen atom. Such functional groups are linked to silicon through preferably at least two carbon to carbon linkages. As examples of such substituents there may be cited aminopropyl, N-methylaminopropyl, aminobutyl and hydroxybutyl groups. Preferred as suitable reactive substituents are the amino substituted groups such as aminopropyl and aminobutyl.

The proportion of these reactive groups present in the organosilicon compound can be varied within wide limits. Improvements in the durability of the silicone treatment over those previously employed is obtained when the proportion of reactive groups to other substituents is very small. However, in most cases it is desirable that more than 0.1% of the total organic substituents present in the organosilicon compound are those containing the reactive hydrogen atoms.

The organosilicon compound appears to become attached to the fibers of the substrate by means of a chemical linkage resulting from the reaction of the replaceable chlorine substituents of the cyanuric chloride with the reactive groups on the silicon compound and the substrate. Provided that the necessary proportion of reactive groups is available in the organosilicon compound for adequate chemical bonding to take place the choice of the remaining substituents is not critical. They can comprise, for example, alkyl radicals such as methyl, ethyl and propyl, alkenyl radicals such as vinyl and allyl, aryl radicals such as phenyl and naphthyl and monovalent substituted hydrocarbon radicals such as perfluoropropyl and chlorophenyl. If desired, the organosilicon compound can contain more than one type of substituent and can also contain silicon-bonded hydrogen atoms. However, it is preferred that the organic substituents which are present in addition to the necessary reactive groups are those such as alkyl and aryl radicals which are hydrophobic and/or oleophobic in nature and resistant to cleavage of the silicon-carbon bond.

The organosilicon polymers employed in the present invention are preferably organosiloxane copolymers in which some of the component siloxane units are those containing the defined reactive substituents the remainder comprising conventional diorganosiloxane units such as, for example, dimethylsiloxane or methylphenylsiloxane units. Particularly suitable are copolymers of methyl (aminopropyl)siloxane or methyl(aminobutyl)siloxane with dimethylsiloxane. Although not essential to the success of the present invention, it is desirable in practice that the copolymers be end-blocked. The presence of trihydrocarbonylsilyl groups such as trimethylsilyl groups as terminal units in the copolymer is advantageous in so far as they are effective in stabilizing the copolymer against change in its viscosity. If desired, mixtures of these polymers and copolymers with organosilicon polymers not containing the hereinbefore defined reactive substituents can be employed.

The operative organosiloxanes include polymers of the unit formula $R_xR'_ySiO_{4-x-y/2}$ where each R is a monovalent radical selected from the group consisting of alkyl, aryl, alkenyl, halogenoalkyl, halogenoaryl and halogenoalkenyl radicals, each R' is a monovalent organic radical containing reactive hydrogen atoms in the form of hydroxyl radicals or amino radicals, $x$ has an average value from 1.0 to 2.5, $y$ has an average value from 0.002 to 1.0 and the sum of $x+y$ does not exceed 3.0

It will readily be seen that monomeric organosilicon compounds can be bonded to a porous and fibrous substrate by means similar to those employed for the organosilicon polymers. In order that bonding of the organosilicon compound will take place it will, of course, be necessary that at least one of the valencies of the silicon is satisfied by an organic substituent containing a reactive hydrogen atom. Typical of the monomeric compounds which are suitable are trimethyl(aminopropyl)silane, methyl(aminobutyl)diethoxysilane, methyl(hydroxybutyl)diethoxysilane and chlorosilanes such as methyl(hydroxypropyl)dichlorosilane. These monomers are of the general formula $R_a R'_b SiZ_{4-a-b}$ where R and R' are as above defined, Z is a hydrolyzable group such as halogen atom or alkoxy radical, $a$ has a value from 0–2 inclusive, $b$ has a value from 1–2 inclusive, and $a+b$ does not exceed 4.0. When the monomeric organosilicon compound contains aminoalkyl groups as the reactive substituents it is desirable that any Z groups present should be alkoxy radicals.

From the foregoing it will be understood that chemical bonding of the organosilicon compound to the fabric by way of the cyanuric halide can take place when there are only two replaceable halogen atoms available in the cyanuric halide. If desired therefore one may employ in the composition of the present invention a mono-substituted cyanuric halide, that is, a cyanuric halide in which one of the halogen atoms has been replaced with, say, an amino group. The use of such a mono-substituted cyanuric halide will however require slightly different reaction conditions, namely a higher drying temperature, in order to promote chemical bonding of the organosilicon compound to the substrate and a higher reaction temperature in the preparation of the organosilicon compound and the cyanuric halide.

The reaction which involves bonding the organosilicon compound to the substrate is facilitated by the presence of an organic base such as an amine. It is therefore desirable that the salts of organic bases employed in the present invention are those which dissociate, at least partially, on heating and/or air-drying the substrate to yield the base at or near the temperature required to bring about reaction between the organosilicon compound with the substrate by way of a cyanuric linkage. Examples of suitable salts are those obtained by the reaction of bases such as pyridine, di-n-butyl-amine, piperidine and triethylamine with, for example, acetic, propionic and hexoic acids. Preferably the salts are those which decompose at temperatures normally employed for the drying of treated textiles, that is within the range of from 50°–200° C., preferably from 90°–150° C. The quantity of the salt employed in the composition is not narrowly critical, generally from 1 to 25% by weight, preferably 5 to 20% by weight, based on the total weight of the polymer and the cyanuric halide being suitable.

When preparing the compositions of this invention it has been found preferable to prepare them in a fairly dilute solution in a volatile organic solvent, that is solutions containing about 20% or less by weight of the reactive ingredients. It has also been found desirable to add the reactive organosilicon compound to the organic halide as this avoids the rapid thickening and ultimate gelation of the product when the cyanuric halide is added to the organosilicon compound. The quantities of the ingredients employed in making up the compositions of this invention are not critical. The quantity of the cyanuric halide employed will depend upon the proportion of reactive organic groups present as substituents in the organosilicon compound. As an example we have found that a 20 percent by weight solution may be prepared by adding 100 grams of an organosilicon copolymer containing 5 mol percent of methyl(aminoalkyl)siloxane units and having a nitrogen content of 0.8% to 400 grams of a solution containing from about 5 to about 20 grams of a cyanuric halide or a mono-substituted cyanuric halide. When the concentration of the cyanuric halide is greater than about 10 percent based on the weight of the organosilicon compound it has been found advantageous to include in the mixture a calculated quantity of a tertiary base such as triethylamine. The addition of the base reduces the thickening of the system and enables a satisfactory storage life to be obtained.

Application of the compositions of the present invention to porous and fibrous materials is preferably carried out from a solution of the ingredients in a suitable solvent or mixture of solvents, for example, toluene, benzene, chloroform or perchloroethylene, and the compositions may be applied by the well known techniques such as padding, dipping and spraying. The dilution of the treating solution is adjusted to obtain the desired pick-up of the organosilicon compound on the cloth and may be varied as required. As an example we have found that a pick-up of about 1% of the organosilicon compound based on the weight of the substrate gives good water repellency and may be obtained by padding through a treating solution containing about 2% of the silicon compound.

After impregnation the substrate is dried. Preferably the drying is achieved by heating the treated material to a temperature at or below about 150° C. The temperature to which the treated material is raised should be sufficient to bring about at least partial decomposition of the salt and promote chemical bonding between the organosilicon compound and the substrate by way of the triazine linkage.

The compositions of the present invention are suitable for the water repellent treatment of a wide variety of porous and fibrous materials containing residual potentially replaceable hydrogen atoms both natural and synthetic such as wool, cotton, nylon, rayon, silk, paper and leather. The compoistions of this invention offer advantages over known materials in that they can be applied in a simple, single step operation and these compositions do not exhibit the objectionable odor characteristic of organic bases heretofore employed. If desired, the compositions of this invention may be applied in conjunction with other textile treating processes, such as, for example, creaseproofing.

The following examples illustrate the invention.

EXAMPLE 1

An amine salt was prepared by mixing together pyridine and propionic acid in benzene to give a 10% by weight solution of the salt.

5 g. of a methyl (δ-aminobutyl)polysiloxane copolymer with dimethylsiloxane containing 5 mol percent of the methyl (δ-aminobutyl)siloxane units and 0.57 g. of cyanuric chloride were dissolved in 375 ml. of toluene. To this oslution was then added 15 g. of the amine salt solution prepared as described above. This final solution, which was slightly turbid, was then employed to treat 6 samples of cotton by padding to a 75% mangle expression. After impregnation the cotton pieces were allowed to air dry for 30 minutes and then oven dried for two short periods at 100° C. and at 150° C.

After drying, two of the cotton pieces were subjected to the Bundesmann water repellency test without further treatment, two pieces were Soxhlet extracted with benzene for 3 hours before test and the remaining two cotton pieces were tested after being subjected to a modified soap and alkali wash according to the Society of Dyers and Colourists (S.D.C.) Test No. 3 washing treatment, in which the test time was extended to six hours.

Analysis for silicon content and Bundesmann values was carried out on each of the cotton samples after treatment. The results obtained are shown in Table 1 together with comparative results (shown in parentheses) obtained for cotton which had been treated with a conventional methyl-hydrogen siloxane type water repellent applied in conjunction with a crease resist resin.

Table 1

| | Bundesmann | | Percent Silicon |
|---|---|---|---|
| | Percent Absorption | Penetration (cc.) | |
| Sample as prepared | 35 (11) | 1 (0) | 0.64 (0.95) |
| After 3 hrs. extraction in benzene | 33 (20) | 0 (3) | 0.59 (0.62) |
| After modified S.D.C. Test No. 3 | 37 (109) | 0 (20) | 0.61 (9.39) |

EXAMPLE 2

Nylon and "Terylene" fabrics were treated by the method of Example 1 and subjected to the same test conditions. The results obtained are shown in Table 2.

Table 2

| | Percent Absorption | | Percent Silicon | |
|---|---|---|---|---|
| | Nylon | Terylene | Nylon | Terylene |
| Sample as prepared | 16 (10) | 18 (10) | 0.64 (1.49) | 0.58 (0.94) |
| After 3 hrs. extraction in benzene | 16 (11) | 18 (10) | 0.60 (0.68) | 0.45 (0.52) |
| After modified S.D.C. Test No. 3 | 18 (38) | 22 (38) | 0.62 (0.91) | 0.44 (0.48) |

EXAMPLE 3

Cotton pieces were treated according to the procedure of Example 1 with the modification that the amine salt employed in this case was prepared by mixing triethylamine and decoic acid.

The results obtained after testing the cotton pieces as described in Example 1 are shown in Table 3.

Table 3

| | Bundesmann | | Percent Silicon |
|---|---|---|---|
| | Percent Absorption | Penetration (cc.) | |
| Sample as prepared | 33 | 0 | 0.70 |
| After 3 hrs. extraction in benzene | 32 | 1 | 0.44 |
| After modified S.D.C. Test No. 3 | 45 | 12 | 0.58 |

EXAMPLE 4

A sample of cotton was padded through a bath containing a 7% by weight aqueous solution of a crease resist resin made up of a mixture of approximately 5% of a reactive urea-formaldehyde resin and 2% of a melamine-formaldehyde resin. The cotton was padded to obtain a 70–75% pick-up, dried at 100° C. and then heated to 150° C. for approximately 3 minutes to cure the crease resist resin. The dried cotton was further padded through a toluene solution containing 1½% by weight of the mixture of the organosilicon copolymer, cyanuric chloride and amine salt employed in Example 1. After impregnation the cotton sample was dried and tested by the procedure detailed in Example 1 and the following results obtained.

Table 4

| | Bundesmann | | Percent Silicon |
|---|---|---|---|
| | Percent Absorption | Penetration (cc.) | |
| Sample as prepared | 31 | 1 | 0.58 |
| After 3 hrs. extraction in benzene | 40 | 1 | 0.45 |
| After modified S.D.C. Test No. 3 | 58 | 40 | 0.60 |

That which is claimed is:

A composition suitable for rendering fibrous materials water repellent consisting essentially of (1) (a) 100 parts by weight of a fluid organosilicon material selected from the group consisting of silanes of the formula $$R_aR'_bSiZ_{4-a-b}$$

wherein each R is a monovalent radical selected from the group consisting of alkyl, aryl, alkenyl, halogenoalkyl, halogenoaryl and halogenoalkenyl radicals, each R' is a monovalent hydrocarbon radical containing reactive hydrogen atoms in the form of radicals selected from the group consisting of hydroxyl radicals and amino radicals, each Z is a hydrolyzable substituent selected from the group consisting of halogen atoms and alkoxy radicals, $a$ has a value from 0 to 2 inclusive, $b$ has a value from 1 to 2 inclusive and $a+b$ does not exceed 4.0, and siloxanes of the general unit formula $R_xR'_ySiO_{4-x-y/2}$ when R and R' are as above defined, $x$ has an average value of from 1.0 to 2.5 inclusive, $y$ has an average value of from 0.002 to 1.0 inclusive and the sum of $x+y$ does not exceed 3.0, (b) 1 to 50 parts by weight of a cyanuric halide, and (2) 1 to 25% by weight based on the total weight of (1) (a) and (b) of a salt of a carboxylic acid containing from 1 to 10 carbon atoms and an organic amine base which decomposes at a temperature in the range of 50° to 200° C.

References Cited by the Examiner
UNITED STATES PATENTS 2,895,853  7/1959  Bailey et al. _____ 117—135.5
3,065,111  11/1962  Reeves et al. _____ 117—135.5

MORRIS LIEBMAN, *Primary Examiner.*

ALLAN LIEBERMAN, *Examiner.*